Aug. 28, 1962

A. N. T. ST. JOHN ET AL  3,050,786

METHODS OF LINING AND JACKETING TUBULAR MEMBERS WITH
PRESTRESSED POLYTETRAFLUOROETHYLENE

Filed Jan. 30, 1957

INVENTORS
ALEXANDER N.T. ST. JOHN
WILLIAM E. TITTERTON

BY Churchill, Weymouth & Engel
ATTORNEYS.

United States Patent Office 3,050,786
Patented Aug. 28, 1962

3,050,786
METHODS OF LINING AND JACKETING TUBULAR MEMBERS WITH PRESTRESSED POLYTETRAFLUOROETHYLENE
Alexander N. T. St. John, Glen Ridge, and William E. Titterton, Whippany, N.J., assignors to Resistoflex Corporation, Roseland, N.Y., a corporation of New York
Filed Jan. 30, 1957, Ser. No. 637,159
11 Claims. (Cl. 18—59)

The present invention relates to the processing of polytetrafluoroethylene. More specifically it relates to a new article of manufacture prepared from polytetrafluoroethylene, the process therefor, and its use.

Polytetrafluoroethylene sold commercially under the trademark "Teflon" (a registered mark of the Dupont Company) has many desirable characteristics, most outstanding of which is its inertness to chemical attack. Because of this ability, it is being sought for use wherever chemicals of a corrosive nature must be handled as well as for other uses too numerous to mention. Although it has considerable toughness and can withstand temperatures in normal usage upwards of 500° F. it is still a plastic without the mechanical strength available in metals or other non-plastic materials. In view of the above, a need has developed for a satisfactory method of combining polytetrafluoroethylene (hereinafter abbreviated P.T.F.E.) with another material having the necessary mechanical strength.

If one were seeking a pipe, for example, having the strength of steel and the chemical inertness of P.T.F.E., the obvious solution would appear to be to line a steel pipe with the resin. Unfortunately this is more easily said than done. A lining in order to be acceptable must be provided in such manner that separation from the pipe wall is precluded during the anticipated life of the pipe. As a lining the material must have sufficient thickness so as to render it impermeable. Considerable difficulty has been encountered in attempting to employ dispersions of P.T.F.E. for coating the interior of a pipe. Multiple coats must be applied in order to build up sufficient wall thickness. At the same time, however, a satisfactory method has not been found for effecting a bond between such a coating and other materials. The alternative method of forcing an out-size liner into a pipe bore can not be utilized for lengths in excess of a few inches.

An object of the present invention is, therefore, to provide a P.T.F.E. liner which is readily insertable into a pipe or other tubular member, regardless of the length thereof, and is adapted to securely engage its walls.

Besides lining a tubular member, it is also advantageous to be able to jacket the outside of a pipe or any other longitudinal member with a thin-walled tube or sheath of P.T.F.E. Here, the dispersion coating may be employed, but only where abrasion is not anticipated. It is, therefore, a further object of the invention to provide a P.T.F.E. tube into which can be readily inserted a longitudinal member with the P.T.F.E. tube adapted to tightly engage the outer surface thereof. This last-mentioned embodiment besides providing chemical resistance is useful where the anti-adherent quality of the P.T.F.E. is required, such as on material handling rolls.

More specifically, the present invention provides as an article of manufacture a tube of pre-stressed sintered polytetrafluoroethylene resin substantially dimensionally stable indefinitely at room temperature but adapted to alter its girth upon being heated to a temperature below the gel point of the resin. The invention further resides in the methods for producing such article and of assembling same to a mating member.

Advantage is taken herein of the discovery that extruded lengths of polytetrafluoroethylene which have been through the sintering cycle may be "frozen" in a deformed pre-stressed condition by stressing the material while heated to a temperature below the gel point and cooling the material before the stress is relieved, or at least before the pre-stressed material has a change to relax appreciably. The pre-stressed material can then be relaxed at any subsequent time by reheating.

The invention will be better understood after reading the following detailed description taken in connection with the accompanying drawings wherein.

Figure 1:
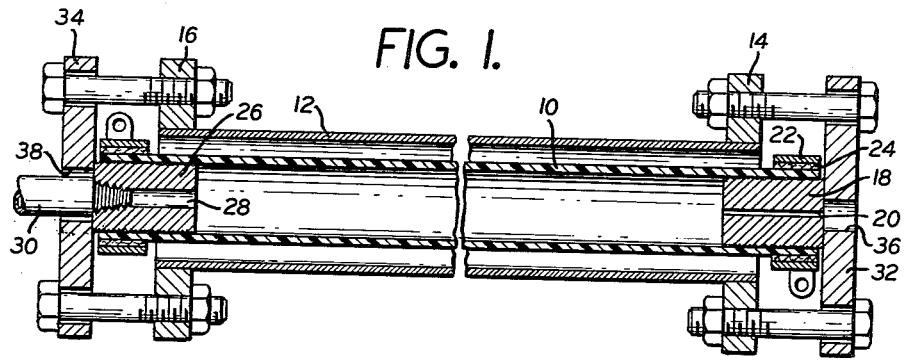
FIG. 1 is a longitudinal sectional view showing a length of sintered polytetrafluoroethylene tubing held in a mold prior to enlargement of its girth.

The preparation of a tube of deformed pre-stressed P.T.F.E. suitable for jacketing a longitudinal member will now be described with reference to a specific example. A length of sintered P.T.F.E. tubing having an outside diameter of .670 inch and a wall thickness of between .04 and .05 inch was mounted within a steel tube having an internal diameter of .875 inch. The complete assembly may be seen in FIG. 1 wherein the P.T.F.E. tubing is designated generally by the reference numeral 10 and the steel tube is designated by the reference numeral 12. The steel tube 12 is shown provided at opposite ends with bolt flanges 14 and 16. One end of the P.T.F.E. tube 10 was fitted with a plug 18 provided with a small vent passage 20. The purpose of the passage 20 will be explained below. As shown in the drawing the end of the P.T.F.E. tube was secured to the plug 18 by clamping means in the form of a strap 22. The strap 22 was spaced from the P.T.F.E. tube by means of a liner 24 of asbestos, although other suitable material could be used. The purpose of the liner was to protect the wall of the P.T.F.E. tube from being pinched or damaged by the strap in a manner which would be conducive to blow-out during the subsequent operations. The opposite end of the P.T.F.E. tube 10 was fitted with a plug 26 which was provided with a bore 28 and an inlet needle valve 30. The plugs 18 and 26 may have their surfaces roughened, as shown, to ensure a tight grip on the tubing.

In order to further safeguard against a blow-out of either plug, a pair of safety retaining plates 32 and 34 were secured to the bolt flanges 14 and 16 as shown. Both plates were provided with a central aperture, the aperture 36 in plate 32 being provided to avoid interference with the passage 20 and the aperture 38 in plate 34 being provided to permit free movement of the needle valve 30 with respect thereto.

It should be observed that the straps 22 were dimensioned and positioned so as to permit axially inward movement thereof relative to the steel tube 12.

Figure 2:
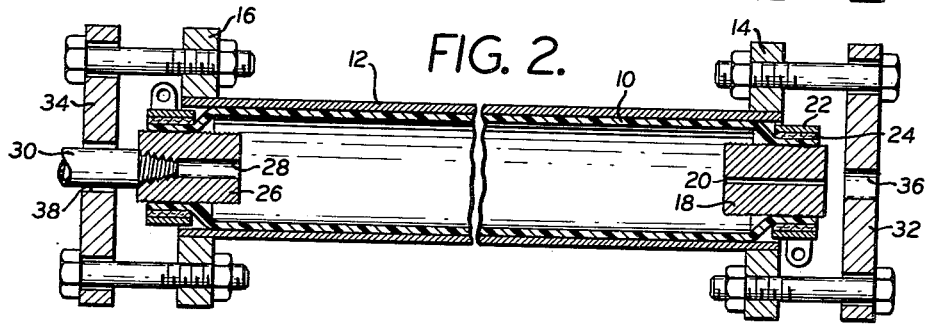
FIG. 2 is a view similar to FIG. 1 showing the resin tube after expansion in the mold.

The gel point of P.T.F.E. is approximately 621° F. In the present example the entire assembly of FIG. 1 was heated to a temperature of 600° F., a temperature below the gel point. This was accomplished by placing the unit in a heating oven (not shown). Upon reaching temperature the unit was removed from the oven, an air pressure line was attached to the needle valve 30, and air was supplied through the valve and plug 26 so as to build up the pressure to approximately 200 pounds per square inch in about 60 seconds. Any sudden rise in internal pressure due to the presence of moisture in the air supply was avoided by the vent passage 20. Under the urging of the internal pressure the P.T.F.E. tube 10 was expanded as shown in FIG. 2 until it engaged the inner wall of the steel tube 12. The end plugs 18 and 26 were drawn inwardly a short distance as a result of the radial expansion or change in girth of the P.T.F.E. tube. It should be noted that the air pressure was admitted relatively slowly so as to avoid a blow-out through the wall of the P.T.F.E. tube. However, it should also be noted that the ultimate forming pressure of 200 p.s.i. is far in excess of that normally employed in blow molding of conventional plastics.

The air pressure was maintained until the P.T.F.E. had cooled to approximately 100° F. The air supply was then disconnected and the P.T.F.E. tube was removed from the assembly. The clamped ends were cut away leaving a uniform tube which, by actual measurement, now had an outside diameter of .860 inch, an increase of .190 inch. It was found that the enlarged tube of P.T.F.E. could be stored in this condition at room temperature for an indefinite period without substantially changing its girth.

In order to test the efficacy of the method, the enlarged tube was slipped over a .750 inch rod. There was now a minimum of 0.010 inch clearance and assembly was an easy matter. The assembled unit was then placed in an oven at a temperature of 600° F. When the expanded tube had attained oven temperature, the heat was turned off and the piece allowed to cool, whereupon it was removed from the oven. It was found that the P.T.F.E. tube had shrunk down upon the rod providing a jacket therefor which was locked so firmly in place it could not be removed by the application of force.

As a result of further study it was found that the P.T.F.E. tube could be expanded or formed at temperatures ranging from 450° F. up to a point just below the gel point. For convenience in forming it is desirable to employ as high a temperature as possible. However, too high a temperature will create conditions which are conducive to rupture or failure of the walls of the tube during the stretching process. A temperature of 600° F. has been found to be an optimum upper limit.

In the example previously described, the enlarged or pre-stressed tube was shrunk on to a metal rod. In such case it is convenient to employ a relaxation temperature equal to the forming temperature. However, the methods described herein contemplate the provision of a P.T.F.E. jacket around materials which would deteriorate if subjected to the forming temperatures of the resin. An example would be the jacketing of a rubber hose. Rubber both natural and synthetic can not be subjected to temperatures in excess of 350° F. Fortuitously, it is not essential that the pre-stressed tube be heated to its forming temperature in order to cause relaxation of the stresses therein and alteration in its girth. It has been found that if sufficient time is taken, relaxation of the P.T.F.E. tube can be accomplished at temperatures as low as 300° F. At 300° F. the heating cycle may require 25 minutes or more in order to afford substantial recovery. When the same temperature as that used in forming can be employed for relaxation the cycle is shortened considerably. It has also been found that the rate of cooling employed during the introduction of the stresses also influences the temperature which can be conveniently employed for relaxation. If the deforming pressure can be maintained on the P.T.F.E. while it is slowly cooled, then the relaxation at the lower temperatures will be more rapid. If, however, the P.T.F.E. is rapidly cooled such as by water quenching, the relaxation time at temperatures well below the deforming temperature will be considerably prolonged.

Next to be considered is the preparation of a pre-stressed length of tubing which is adapted to be used as a liner. As with the previous example, a length of P.T.F.E. tubing which has been extruded and sintered is provided with end plugs.

Figure 3:
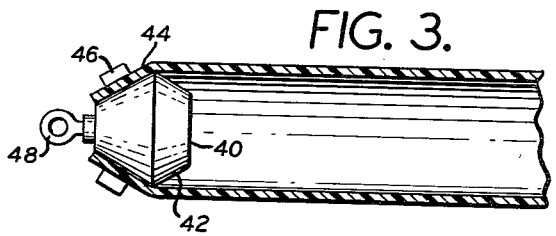
FIG. 3 is a fragmentary transverse sectional view of one end of a length of sintered polytetrafluoroethylene tubing fitted with an end plug preparatory to reduction of its girth.

Referring to FIG. 3 one end of a length of sintered tubing is shown fitted with a plug 40 having a tapered rearward portion 42 about which the end of the tube 44 is tightly clamped by means of a strap or similar member 46. The plug is provided with a pull 48 which, as shown, may take the form of an eye. The opposite end of the tube, which is not shown in the drawing, is provided with a similar plug arrangement. Although not shown, the plugs are provided with venting perforations or apertures to prevent a build-up of internal pressure during the subsequent application of heat. As in the previous example the tubing with the end plugs fitted thereto will be placed in a suitable oven and heated until the tubing reaches a temperature below its gel point and preferably 600° F. The tubing is then removed from the oven and before it has an opportunity to cool much below the aforementioned temperature the respective end plugs will be grasped and axial tension applied to the tube. The tube should be stretched at a rate which will cause it to neck down or reduce in girth perhaps a quarter of an inch in a matter of two or three minutes or less. The actual rate at which it can be stretched will depend to a great extent upon the wall thickness and is limited by the ability of the material to accommodate itself to the deformation.

When the desired reduction in girth is attained, further stretching is halted and the tension is maintained while the tube cools. A quench bath may be employed if desired. When the temperature has dropped to the neighborhood of 100° F. the end plugs may be released and removed from the body of the tube. If the initial size of the P.T.F.E. tubing is properly selected, then the tube of reduced perimeter or girth will be susceptible of easy insertion into the tubular member it is to line. The assembled tubes may now be placed in an oven and heated as in the previous example in order to return the P.T.F.E. tube towards its original size. Due allowance should be made for the decrease in axial length of the liner during the last step. It will be found that the liner will expand its girth so as to tightly engage the inner wall of the pipe or other tubular member within which it is positioned.

Figure 4:
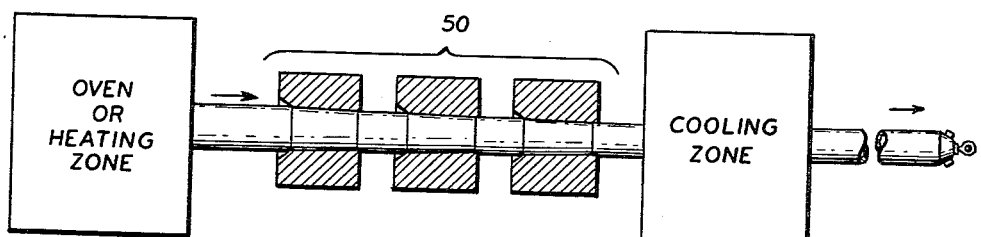
FIG. 4 is a diagrammatic representation of a length of sintered polytetrafluoroethylene tubing being drawn through reducing dies.

Instead of stretching a length of tubing in order to reduce its girth, the method illustrated graphically in FIG. 4 may be employed. The tubing is initially prepared in the same manner as described with reference to FIG. 3 except only one end is provided with a plug and pull. After the material has been suitably heated in the oven or heating zone to a temperature below its gel point it can be withdrawn and passed through one or more reducing dies, shown generally at 50. Since in this embodiment of the invention a continuing strain cannot be applied to the tubing it must be passed immediately through a rapid cooling zone, as shown, upon leaving the reducing dies and before it has an opportunity to relax appreciably. The cooling zone may be comprised of a plurality of spray nozzles for engulfing the tubing in a quenching bath.

With respect to both of the methods described with reference to FIGS. 3 and 4 the temperatures employed for both deforming and relaxing will be controlled by the same considerations covered in discussing the first example with reference to FIGS. 1 and 2.

With respect to all of the methods already described it is theoretically possible to carry out the sintering and the subsequent deformation of the tubing in a continuous process. However, due to the gross physical change occurring to the extruded tubing during the sintering thereof it is not now thought to be feasible to fasten the end plugs to the extruded tubing in the unsintered state. However, there is no reason why the raw extruded tubing cannot be placed in a sintering oven and passed through the normal sintering cycle at temperatures in the neighborhood of 700° F., and thereafter be grasped by suitable engaging means after having cooled to a point below the gel temperature, say 600° F. The tubing could then be stretched or reduced in girth by either of the methods of FIGS. 3 or 4.

In order to avoid the development of excessive stresses in the P.T.F.E. whether it forms a liner or a jacket it is desirable to relate the starting or initial size of the P.T.F.E. tubing to the size of the member with which it is to mate such that the deformation required approaches a minimum. Working with tubing of circular cross-section satisfactory results have been obtained where the diameter of the P.T.F.E. tubing is altered by a quarter of an inch in order to afford a clearance with the mating element of between .010 and .060 inch.

There thus is provided a method by which a length of thin-walled P.T.F.E. tubing may be deformed and pre-stressed for either lining or jacketing a corresponding longitudinal member. The invention has been described in terms of the preferred embodiments thereof and will be susceptible of modification by those skilled in the art without departing from the scope of the appended claims.

What we claim is:

1. The method of tightly jacketing a longitudinal member with polytetrafluoroethylene resin which comprises the steps of selecting a pre-stressed sintered tube of said resin which is substantially dimensionally stable indefinitely at room temperature but adapted due to its pre-stressing to alter its girth substantially uniformly throughout its length without the assistance of molding pressure upon being heated to a given temperature between 300° F. and 620° F. and thereafter cooled, the nature of said pre-stressed tube being such that its internal perimeter was smaller than the external perimeter of a longitudinal member which it is to jacket prior to pre-stressing but is now adapted to mate loosely with said longitudinal member, inserting the longitudinal member within the selected pre-stressed tube, heating the assembly of said tube and member to said given temperature, and thereafter cooling the assembly.

2. The method of tightly lining a longitudinal tubular member with polytetrafluoroethylene resin which comprises the steps of selecting a pre-stressed sintered tube of said resin which is substantially dimensionally stable indefinitely at room temperature but adapted due to its pre-stressing to alter its girth substantially uniformly throughout its length without the assistance of molding pressure upon being heated to a given temperature between 300° F. and 620° F. and thereafter cooled, the nature of said pre-stressed tube being such that its external perimeter was larger than the internal perimeter of a longitudinal tubular member which it is to line prior to pre-stressing but is now adapted to mate loosely with said tubular member, inserting the selected pre-stressed tube within the tubular member, heating the assembly of said tube and member to said given temperature, and thereafter cooling the assembly.

3. The method of tightly lining a longitudinal tubular member with polytetrafluoroethylene resin which comprises the steps of selecting a pre-stressed sintered tube of said resin of greater length than a longitudinal tubular member which it is to line, said pre-stressed tube being substantially dimensionally stable indefinitely at room temperature but adapted due to its pre-stressing to alter its girth substantially uniformly throughout its length without the assistance of molding pressure upon being heated to a given temperature between 300° F. and 620° F. and thereafter cooled, the nature of said pre-stressed tube being such that its external perimeter was larger than the internal perimeter of said longitudinal tubular member prior to pre-stressing but is now adapted to mate loosely with said tubular member, inserting the selected pre-stressed tube within the tubular member with the ends of said pre-stressed tube extending beyond the ends of said tubular member a distance sufficient to allow for decrease in axial length of the pre-stressed tube while its girth is being altered, heating the assembly of said tube and tubular member to said given temperature, and thereafter cooling the assembly.

4. The method of tightly securing to a longitudinal member a tube of polytetrafluoroethylene resin which comprises the steps of selecting and interfitting with a longitudinal tubular member a pre-stressed sintered tube of said resin which is substantially dimensionally stable indefinitely at room temperature but adapted due to its pre-stressing to alter its girth substantially uniformly throughout its length without the assistance of molding pressure upon being heated to a given temperature between 300° F. and 620° F. and thereafter cooled, the nature of said pre-stressed tube being such that its girth was altered during pre-stressing from a size preventing interfitting to a size readily permitting interfitting, heating the interfitted assembly of said tube and tubular member to said given temperature, and thereafter cooling the assembly.

5. The method of tightly securing to a longitudinal member a tube of polytetrafluoroethylene resin which comprises the steps of selecting a sintered tube of said resin having a girth of a size preventing interfitting with a longitudinal member, heating the tube to a given temperature between 450° F. and 620° F. and altering its girth while so heated to a size readily permitting interfitting with said longitudinal member thereby pre-stressing the tube, interfitting said pre-stressed tube with said longitudinal member, heating the interfitted assembly of said tube and member to a temperature between 300° F. and 620° F. for a time sufficient to cause the tube to return partially toward its original size into tight engagement with the longitudinal member, and thereafter cooling the assembly.

6. The method of tightly lining a longitudinal tubular member with polytetrafluoroethylene resin which comprises the steps of selecting a sintered tube of said resin with an outer perimeter of a size preventing interfitting with a longitudinal tubular member, heating the tube to a given temperature between 450° F. and 620° F. and reducing its perimeter while so heated to a size readily permitting interfitting with said longitudinal member thereby pre-stressing the tube, cooling the tube so as to retain substantially said size, inserting the pre-stressed tube within the tubular member, heating the assembly of said tube and tubular member to a temperature between 300° F. and 620° F. for a time sufficient to cause the resin to expand partially toward its original size into tight engagement with the longitudinal member, and thereafter cooling the assembly.

7. The method of tightly jacketing a longitudinal member with polytetrafluoroethylene resin which comprises the steps of taking a tube of sintered polytetrafluoroethylene resin whose internal perimeter is smaller than the external perimeter of a longitudinal member which it is to jacket and heating the tube to a preselected elevated temperature between 450° F. and 620° F., applying a deforming force to said tube while so heated so as to enlarge its internal perimeter sufficiently to mate loosely with said longitudinal member, cooling said tube while maintaining the application of said force, subsequently removing said force, next inserting the longitudinal member within the tube, heating the assembly thus formed of said tube and member to a temperature between 300° F. and 620° F. and thereafter cooling the assembly.

8. The method according to claim 7, wherein said preselected temperature is in the neighborhood of 600° F.

9. The method of tightly lining a longitudinal tubular member with polytetrafluoroethylene resin which comprises the steps of taking a tube of sintered polytetrafluoroethylene resin whose external perimeter is larger than the internal perimeter of a tubular member which it is to line and heating the tube to a preselected elevated temperature between 450° F. and 620° F., applying a deforming force to said tube while so heated so as to shrink its external perimeter sufficiently to enable interfitting with said tubular member, inserting the tube within the tubular member, heating the assembly thus formed of said tube and tubular member to an elevated temperature between 300° F. and 620° F. for a time sufficient to cause the tube to return partially toward its original size into tight engagement with the longitudinal member, and thereafter cooling the assembly.

10. The method of tightly lining a longitudinal tubular member with polytetrafluoroethylene resin which comprises the steps of taking a tube of sintered polytetrafluoroethylene resin whose external perimeter is larger than the internal perimeter of a tubular member which it is to line and heating the tube to a preselected temperature between 450° F. and 620° F., applying a deforming force to said tube while so heated so as to shrink its external perimeter sufficiently to mate loosely with said tubular member, cooling said tube while maintaining the application of said force, subsequently removing said force, next inserting the tube within the tubular member, heating the assembly thus formed of said tube and tubular member to said preselected temperature, and thereafter cooling the assembly.

11. The method according to claim 10, wherein said preselected temperature is in the neighborhood of 600° F.

References Cited in the file of this patent

UNITED STATES PATENTS

| | | |
|---|---|---|
| 1,052,081 | Miltner | Feb. 4, 1913 |
| 2,027,962 | Currie | Jan. 14, 1936 |
| 2,377,928 | Fielitz et al. | June 12, 1945 |
| 2,400,099 | Brubaker et al. | May 14, 1946 |
| 2,452,884 | Werner | Nov. 2, 1948 |
| 2,578,522 | Edgar | Dec. 11, 1951 |
| 2,616,127 | Pfeiffer et al. | Nov. 4, 1952 |
| 2,661,499 | James et al. | Dec. 8, 1953 |
| 2,724,672 | Rubin | Nov. 22, 1955 |
| 2,728,356 | Brinsmade et al. | Dec. 27, 1955 |
| 2,752,637 | Walker | July 3, 1956 |
| 2,774,993 | Hagen et al. | Dec. 25, 1956 |
| 2,781,552 | Gray | Feb. 19, 1957 |
| 2,821,155 | Seckel | Jan. 28, 1958 |
| 2,907,103 | Lewis et al. | Oct. 6, 1959 |

OTHER REFERENCES

Publication, "Modern Plastics," December 1952, vol. 30, No. 4, pp. 79–87.